(12) United States Patent
Pan et al.

(10) Patent No.: US 9,385,943 B2
(45) Date of Patent: Jul. 5, 2016

(54) ENCODING AND PROCESSING OF SIGNALING MESSAGES FOR ODU SMP

(75) Inventors: Ping Pan, San Jose, CA (US); Radhakrishna Valiveti, Fremont, CA (US); Rajan Rao, Cupertino, CA (US); Biao Lu, Saratoga, CA (US)

(73) Assignee: Infinera Corporation, Sunnyvale, CA (US)

( * ) Notice: Subject to any disclaimer, the term of this patent is extended or adjusted under 35 U.S.C. 154(b) by 464 days.

(21) Appl. No.: 13/310,233

(22) Filed: Dec. 2, 2011

(65) Prior Publication Data

US 2013/0071117 A1    Mar. 21, 2013

Related U.S. Application Data

(60) Provisional application No. 61/536,162, filed on Sep. 19, 2011.

(51) Int. Cl.
| | | |
|---|---|---|
| H04J 14/02 | (2006.01) | |
| H04J 3/12 | (2006.01) | |
| H04L 12/703 | (2013.01) | |
| H04J 3/16 | (2006.01) | |
| H04L 12/721 | (2013.01) | |
| H04L 12/723 | (2013.01) | |

(52) U.S. Cl.
CPC . *H04L 45/28* (2013.01); *H04J 3/12* (2013.01); *H04J 3/1652* (2013.01); *H04J 14/0258* (2013.01); *H04J 14/0284* (2013.01); *H04J 14/0295* (2013.01); *H04J 2203/006* (2013.01); *H04L 45/50* (2013.01); *H04L 45/62* (2013.01)

(58) Field of Classification Search
CPC ..... H04J 3/1652; H04J 3/1658; H04J 3/1664; H04J 3/167
USPC .......................................................... 398/1–5
See application file for complete search history.

(56) References Cited

U.S. PATENT DOCUMENTS

| | | | | |
|---|---|---|---|---|
| 2004/0076114 | A1* | 4/2004 | Miriello et al. | 370/222 |
| 2009/0129772 | A1* | 5/2009 | Trudel et al. | 398/8 |
| 2011/0004700 | A1* | 1/2011 | Sprague et al. | 709/236 |

* cited by examiner

*Primary Examiner* — Leslie Pascal
(74) *Attorney, Agent, or Firm* — Dunlap Codding PC; David L. Soltz

(57) ABSTRACT

Methods and nodes are disclosed for the support of traffic protection and recovery in mesh networks having multiple nodes communicating via communication links. The problem of timely and reliable Shared Mesh Protection message delivery is addressed through creation of protocols and encoding of Shared Mesh Protection messages within an overhead of the optical data unit container, and by processing the Shared Mesh Protection messages by intermediate nodes of the mesh network. Thus, the Shared Mesh Protection messages are transmitted through the data plane with the transmission of user data.

17 Claims, 11 Drawing Sheets

| Value | Request Type | Action Type |
|---|---|---|
| 1111 | Lockout of Protection (LO) | (Both ends can lock out the protection) |
| 1110 | Forced Switch (FS) | Activation |
| 1100 | Signal Fail (SF) | Activation |
| 1010 | Signal Degrade (SD) | Activation |
| 1000 | Manual Switch (MS) | Activation |
| 1010 | *Acknowledgement (ACK)* | *Notify* |
| 1001 | *Negative Acknowledgement (NACK)* | *Notify* |
| 0110 | Wait-to-Restore (WTR) | (For revertive switching) |
| 0100 | Exercise (EXER) | Query |
| 0010 | Reverse Request (RR) | (N/A) |
| 0001 | Do Not Revert (DNR) | (For revertive switching) |
| 0000 | No Request (NR) | De-activation |
| Others | Reserved for future international standardization | |

FIG. 3

| Global ConnectionID | Local ConnectionID (per-TS) | | | | Set of TS occupied by Connection |
|---|---|---|---|---|---|
| | TS#1 | TS#2 | TS#3 | TS#4 | |
| C1 | 1 | 3 | - | - | {1,2} |
| C2 | 2 | - | 1 | - | {1,3} |
| C3 | 3 | - | - | - | {1} |
| C4 | 4 | 1 | - | - | {1,2} |
| C5 | - | - | 2 | 1 | {3,4} |
| C6 | - | - | 3 | 2 | {3,4} |

FIG. 8

ENCODING AND PROCESSING OF SIGNALING MESSAGES FOR ODU SMP

CROSS-REFERENCE TO RELATED APPLICATIONS

The present patent application claims priority to the provisional patent application identified by U.S. Ser. No. 61/536,162 titled "Encoding & Processing of Signaling Messages for ODU SMP" filed on Sep. 19, 2011, the entire content of which is hereby incorporated herein by reference.

FIELD OF THE DISCLOSURE

The disclosure generally relates to methods and apparatuses for the support of traffic protection and recovery in mesh networks having multiple nodes communicating via communication links. More particularly the disclosure relates to transport mechanisms in the form of encoding messages through optical channel data unit (ODU) switched Optical Transport Networks (OTN) with Shared Mesh Protection (SMP). Though the methodologies set forth herein are in the context of Generalized Multiprotocol Label Switching (GMPLS) based traffic engineering (TE) routing for Optical Transport Networks, such methodologies may be applied to any interface/network that supports different types of label switched paths.

BACKGROUND

A circuit switched network usually includes multiple switch nodes which are arranged in a topology referred to in the art as a "shared mesh network". Within the shared mesh network, user traffic can be transported between any two locations using predefined connections specifying particular links and/or switch nodes for conveying the user traffic. The terms "switch nodes" and "nodes" are used interchangeably herein.

The switch nodes are each provided with a control module. The control modules of the switch nodes function together to aid in the control and management of the circuit switched networks. The control modules can run a variety of protocols for conducting the control and management of the circuit switched networks. One prominent protocol is referred to in the art as "Generalized Multiprotocol Label Switching (GMPLS)".

Generalized Multiprotocol Label Switching (GMPLS) is a type of protocol which extends Multiprotocol Label Switching (MPLS) to encompass network schemes based upon time-division multiplexing (e.g. SONET/SDH, PDH, G.709), wavelength multiplexing, and spatial switching (e.g. incoming port or fiber to outgoing port or fiber). Multiplexing, such as time-division multiplexing (TDM), is when two or more signals or bit streams are transferred over a common channel. In particular, time-division multiplexing (TDM) is a type of digital multiplexing in which two or more signals or bit streams are transferred as sub-channels in one communication channel, but are physically taking turns on the communication channel. The time domain is divided into several recurrent timeslots of fixed length, one for each sub-channel. After the last sub-channel, the cycle starts over again. Time-division multiplexing is commonly used for circuit mode communication with a fixed number of channels and constant bandwidth per channel. Time-division multiplexing differs from statistical multiplexing, such as packet switching, in that the timeslots are returned in a fixed order and preallocated to the channels, rather than scheduled on a packet by packet basis.

The optical transport hierarchy (OTH) supports the operation and management aspects of optical networks of various architectures, e.g., point-to-point, ring and mesh architectures. One part of the optical transport hierarchy is a multiplex hierarchy, which is a hierarchy consisting of an ordered repetition of tandem digital multiplexers that produce signals of successively higher data rates at each level of the hierarchy. For example, a multiplexing hierarchy may be specified by way of optical channel data units, i.e., ODUj, where j varies from 0 to 4; and optical channel transport units, i.e., OTUk, where k varies from 1 to 4. The optical channel data units (ODUs) refer to a frame format for transmitting data which can be either fixed in the amount of data and data rate or variable in the amount of data and/or data rate.

Examples of optical channel data units that are fixed in the amount of data and data rate include those specified by ODU0, ODU1, ODU2, ODU3, and ODU4. An example of an optical channel data unit that is variable in the amount of data and/or data rate is referred to in the art as ODUflex.

One of the properties of the multiplexing hierarchy is that while the data rate changes over the different levels in the multiplexing hierarchy, the frame format remains identical.

The optical channel data units within the multiplexing hierarchy are referred to in the art as lower order (LO-ODU) or higher order (HO-ODU). A higher order optical channel data unit (HO-ODU) refers to a server layer to which a lower order optical channel data unit (LO-ODU) (client layer) is mapped. Optical channel data units include a parameter referred to as tributary slot granularity which refers to a data rate of the timeslots within the optical channel data unit.

Generalized Multiprotocol Label Switching includes multiple types of optical channel data unit label switched paths including protection and recovery mechanisms which specifies predefined (1) working connections within a shared mesh network having multiple nodes and communication links for transmitting data between a headend node and a tailend node; and (2) protecting connections specifying a different group of nodes and/or communication links for transmitting data between the headend node to the tailend node in the event that one or more of the working connections fail. A first node of a path is referred to as a headend node. A last node of a path is referred to as a tailend node. An edge node may be a tailend node or a headend node. The node(s) in a path between the headend node and the tailend node may be referred to as intermediate node(s).

Data is initially transmitted over the optical channel data unit label switched path (LSP), referred to as the working connection, and then, when a working connection fails, the headend node or tailend node activates one of the protecting connections for redirecting data within the shared mesh network.

Shared Mesh Protection (SMP) is a common protection and recovery mechanism in transport networks, where multiple paths can share the same set of network resources for protection purposes. "G.smp" as described in Reference [1], is a protocol describing the architecture of Shared Mesh Protection. Within this architecture, Shared Mesh Protection messages are important to the operation of a shared mesh network, and consequently to the service experience of the network users.

However, despite the importance of Shared Mesh Protection messages to a shared mesh network and the shared mesh network users, there is not currently a reliable method to achieve timely and reliable message delivery of Shared Mesh Protection messages. The presently disclosed and claimed inventive concepts address this issue by supporting the encoding of Shared Mesh Protection protocol information into the optical data unit container overhead (ODU OH).

SUMMARY

Methods and nodes are disclosed. The problem of timely and reliable Shared Mesh Protection message delivery is addressed through creation of protocols and encoding of Shared Mesh Protection protocol information within the optical data unit container overhead.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 3 is a table of exemplary encoding values for the shared mesh protection message.

FIG. 8 is a table illustrating an exemplary use of a connection identification for an exemplary Tributary Slot.

DETAILED DESCRIPTION

Figure 1:
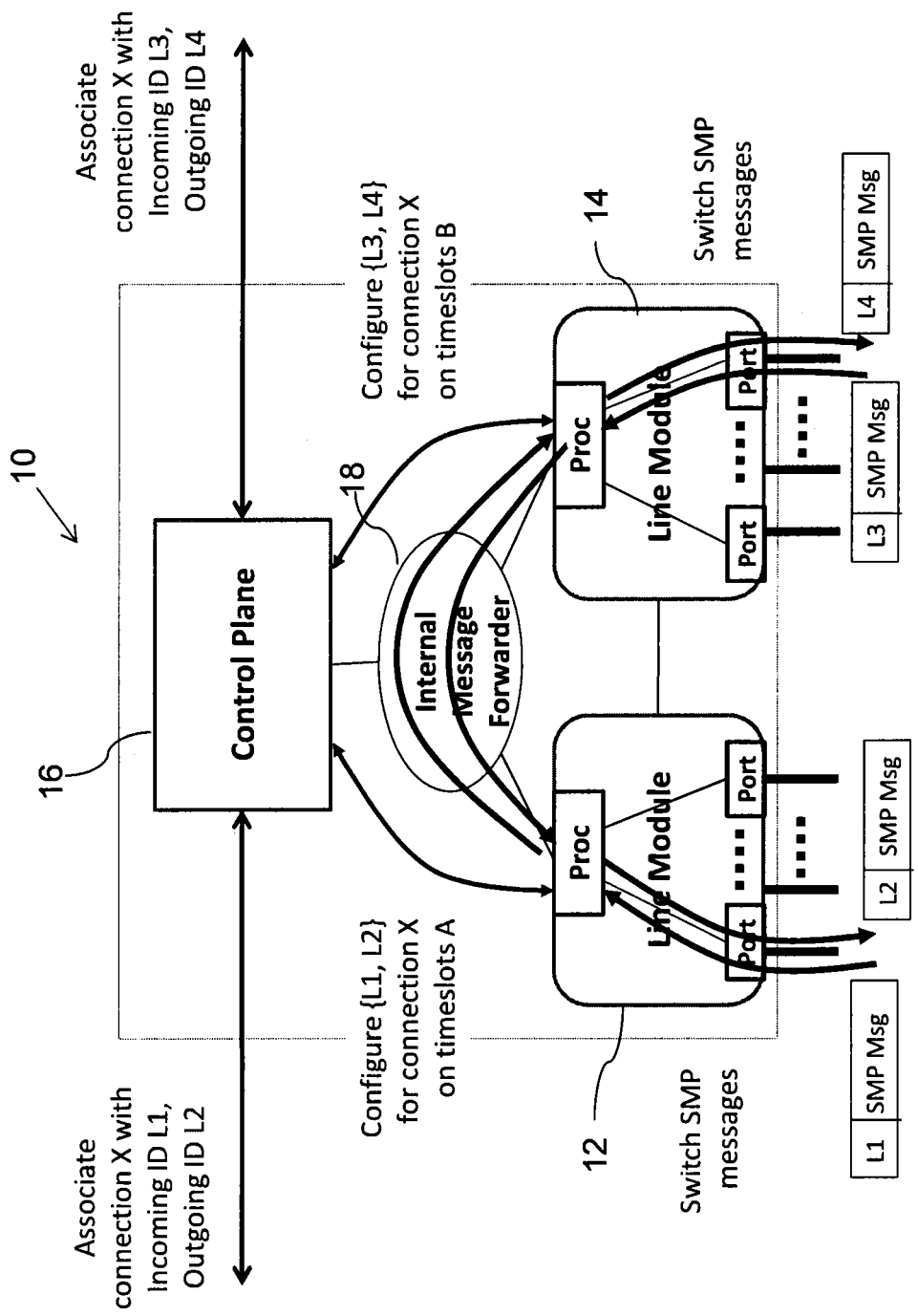
FIG. 1 is a diagram of an exemplary switch node constructed in accordance with the present disclosure, the switch node interpreting and forwarding an optical data unit container having a shared mesh protection (SMP) message encoded into an overhead of the optical data unit container.

The following detailed description refers to the accompanying drawings. The same reference numbers in different drawings may identify the same or similar elements.

DEFINITIONS

If used throughout the description and the drawings, the following short terms have the following meanings unless otherwise stated:

APS stands for Automatic Protection Switching Channel. Prior to the present disclosure, the APS Channel is used to carry information between the two ends of a linear protection group to coordinate an initiating node (which has the function of transmitting traffic on both the working and protection label switched path) with a termination node for 1:n protection (in which ratio "1" is the number of working connections and "n" is the number of protecting connections), and to coordinate the selectors in both directions in the case of bidirectional protection.

Bandwidth is the data transfer capacity of a link or connection, which may be expressed in optical data units, bits per second, number of time slots, or expressed by other methods.

GCC stands for General Communication Channel which is an in-band side channel used to carry transmission management and signaling information within Optical Transport Network elements.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

IP stands for Internet Protocol which is a protocol used for communicating data across a packet-switched internetwork using the Internet Protocol Suite, also referred to as TCP/IP.

LSP stands for Label Switched Path which is a path through a Generalized Multi-Protocol Label Switching network. Note that Label Switched Paths can be bidirectional or unidirectional; Label Switched Paths enable packets to be label switched through the Multiprotocol Label Switched network from a port on an ingress node (which can be called a headend node) to a port on an egress node (which can be called a tailend node).

MFAS stands for multi-frame alignment signal.

MPLS stands for Multi-Protocol Label Switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol. In MPLS, labels are assigned to data packets. Packet forwarding decisions from one node to the next node in the network are made based on the contents of the label for each data packet, without the need to examine the data packet itself.

OTN stands for Optical Transport Network which includes a set of optical switch nodes which are connected by optical fiber links. ITU-T recommendations G.709 and G.872 define OTN interface requirements and network architecture respectively. G.709.3 defines linear protection in Optical Transport Networks.

SMP stands for Shared Mesh Protection. SMP is a common protection and recovery mechanism in transport networks, where multiple paths can share the same set of network resources for protection purposes.

SONET/SDH stands for Synchronous Optical Networking/Synchronous Digital Hierarchy which are standardized multiplexer protocols that transfer multiple digital bit streams over optical fiber using lasers or light emitting diodes.

TE stands for Traffic Engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

TS stands for Tributary Slot or Time Slot. The terms "Tributary Slot" and "Time Slot" are referred to interchangeably. A Time Slot is a division of a data stream into chunks of continuous bytes associated with particular channels. The number of bytes may vary or may be the same. In some implementations, Time Slots may be identified based on identifiers in the data stream.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

In accordance with the present disclosure, messages transmitted between nodes, such as Shared Mesh Protection Messages, can be processed by circuitry within an input interface(s), and/or an output interface(s) and/or the control module. Circuitry could be analog and/or digital, components, or one or more suitably programmed microprocessors and associated hardware and software, or hardwired logic. Also, "components" may perform one or more functions. The term "component," may include hardware, such as a processor, an application specific integrated circuit (ASIC), or a field programmable gate array (FPGA), or a combination of hardware and software. Software includes one or more computer executable instructions that when executed by one or more component cause the component to perform a specified function. It should be understood that the algorithms described herein are stored on one or more non-transient memory. Exemplary non-transient memory includes random access memory, read only memory, flash memory or the like. Such non-transient memory can be electrically based or optically based. Further, the messages described herein may be generated by the components and result in various physical transformations.

Figure 2:
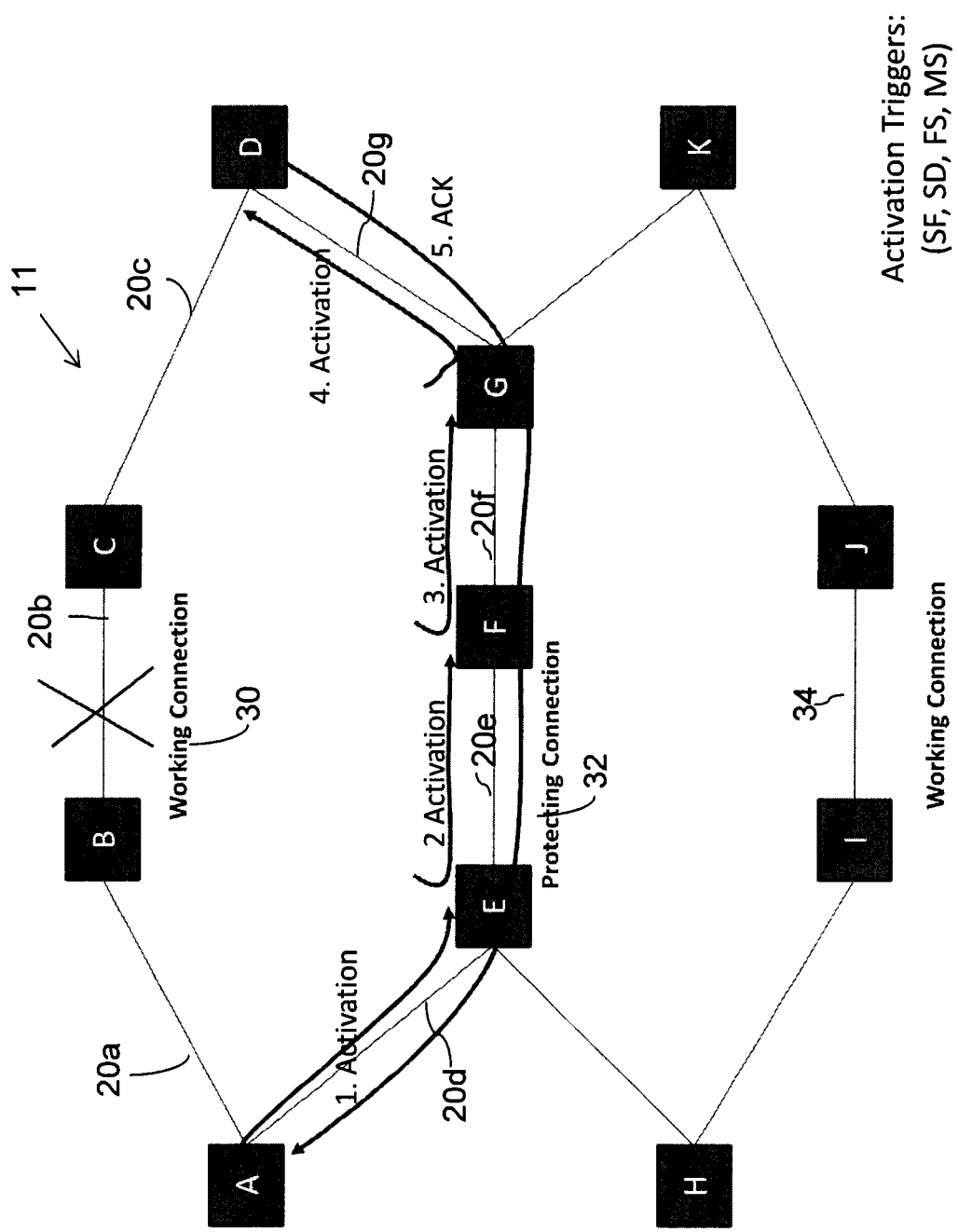
FIG. 2 is a diagram of an exemplary shared mesh network having a failure of a working connection and illustrating a successful activation sequence activating a protecting connection.

Referring now to the drawings, and in particular to FIG. 1, shown therein and designated by reference numeral 10 is an exemplary node constructed in accordance with the present disclosure. The node 10 is adapted to facilitate the communication of data (which may be referred to herein as "traffic") between multiple nodes 10 in a mesh network 11 (as shown in FIG. 2). The traffic may include Shared Mesh Protection Messages encoded within an overhead of an optical date unit container frame as will be discussed hereinafter.

The node 10 is provided with one or more ingress line modules 12 (also referred to as input interfaces), one or more egress line modules 14 (also referred to as output interfaces), a control plane 16, and a switch. The control plane 16 is a logical entity that can be implemented in a variety of manners, such as by a control module. The switch may be implemented in a variety of manners, such as the Internal Message Forwarder 18 shown in FIG. 1.

In general, the ingress line modules 12 are adapted to receive traffic from the mesh network 11, and the egress line modules 14 are adapted to transmit traffic onto the mesh network 11. The Internal Message Forwarder 18 may serve to communicate the traffic and Shared Mesh Protection Messages from the ingress line module(s) 12, to the egress line module(s) 14. And, the control plane 16 serves to control the operations of the ingress line modules 12, the egress line modules 14, and the Internal Message Forwarder 18.

The node 10 can be implemented in a variety of manners, including commercial installations having one or more backplanes (not shown), racks, and the like. In this example, the ingress line modules 12, the egress line modules 14, the control plane 16 and the Internal Message Forwarder 18 are typically implemented as separate devices, which may have their own power supply, local memory and processing equipment. In another example, the node 10 can be implemented as a single device having a shared power supply, memory and processing equipment. Or, in another example, the node 10 can be implemented in a modular manner in which one or more of the ingress line modules 12, the egress line modules 14, the control plane 16 and the Internal Message Forwarder 18 share a power supply and/or housing.

The ingress line modules 12, and the egress line modules 14 of one node 10 are adapted to communicate with corresponding ingress line modules 12, and egress line modules 14 of another node 10 within the mesh network 11 via a communication link 20 (as shown in FIG. 2).

An example of an ingress line module 12 and/or an egress line module 14 is an Ethernet card or optical port. In general, each of the ingress line modules 12 and/or the egress line modules 14 may have a unique logical identification, such as an IP address. The communication link 20 can be implemented in a variety of manners, such as a physical link including electrical (e.g., copper wire or coax) and/or optical signal (e.g., optical fiber or other waveguide) carrying capabilities, or as a wireless link. The implementation of the ingress line modules 12, and the egress line modules 14 will depend upon with which particular type of communication link 20 that the particular ingress line module 12 and/or egress line module 14 is designed to communicate. For example, one of the ingress line modules 12 can be designed to communicate wirelessly with another node 10 within the mesh network 11, while one of the egress line modules 14 of the node 10 can be designed to communicate optically through a fiber-optic link. For a particular node 10, the ingress line modules 12 can be of the same type or different types; the egress line modules 14 can be of the same type or different types; and the ingress line modules 12 and egress line modules 14 can be of the same type or different types.

It should be understood that the node 10 can be implemented in a variety of manners including those shown and discussed in U.S. Patent Application No. 20090245289 entitled "Programmable Time Division Multiplexed Switching" the entire content of which is hereby incorporated herein by reference.

Typically, at each intermediate node, shown by way of example as the node 10, process control messages such as the Shared Mesh Protection messages are delivered to a control plane 16 for extensive processing. However, for efficiency, it is possible to process some messages by circuitry within the ingress line module(s) 12 and/or the egress line module(s) 14 directly. In other words, the ingress line module 12, and/or the egress line module 14 may pick up and process control messages, such as Shared Mesh Protection Messages, from in-band channels and deliver the control messages to other ingress line modules 12 and/or egress line modules 14 and/or the switch after processing.

Shared Mesh Protection messages may be processed by circuitry within the ingress line module(s) 12, and/or the egress line module(s) 14 and then the control plane 16 is notified of any actions taken. Circuitry could be analog and/or digital, components, or one or more suitably programmed microprocessors and associated hardware and software, or hardwired logic. Further, the ingress line module(s) 12 and/or the egress line module(s) 14 may retrieve information from the control plane 16 regarding the protecting connections and the like for processing the Shared Mesh Protection messages.

To implement shared mesh protection restoration, the ingress and line modules 12 and 14 keep track of the connections and associated network resources (e.g. time slots in a time-division multiplexing switching). Upon the reception of Shared Mesh Protection messages, the line modules 12 and 14 can identify the protecting connections, and activate them accordingly.

The node 10 in FIG. 1 further illustrates an activation operation on a circuit switch node. The system can set up the working connections and/or protecting connections and assign identifications. Each bi-directional protecting connection on the particular node is associated with four identifications, L1 and L2 on the ingress line module 12, and L3 and L4 on the egress line module 14.

Upon the detection of network failure, the headend nodes, as depicted in FIG. 2, will transmit Shared Mesh Protection Activation messages along a chosen protection path with the appropriate identifications. When receiving the Shared Mesh Protection messages, the line modules 12 and 14, as shown in FIG. 1, can look up the identifications in the associated logical tables, locate the associated time slots on the protecting connection, and perform an activation operation by programming the switching fabric directly. In-band signaling utilizes the same channel that carries the data traffic, such as the protecting connection that is being activated in accordance with the present disclosure. G.smp [1] describes the architecture of shared mesh protection (SMP) as in a shared mesh network, such as that shown in FIG. 2.

Shown in FIG. 2 is an exemplary shared mesh network 11, formed of multiple nodes 10 which are labeled as A-K in accordance with the present disclosure. The mesh network 11 can include more or less than eleven nodes, such eleven are shown for purposes of simplicity. The nodes 10 are provided with alphabetic designations A, B, C, D, E, F, G, H, I, J and K. In this example, the shared mesh network 11 includes headend nodes A and H; tailend nodes D and K; and intermediate nodes B, C, E, F, G, I and J.

In particular, the nodes A, B, C and D are configured to communicate via a first optical channel data unit (ODU) label switched path 30 along the communication links 20a, 20b, and 20c; while the nodes A, E, F, G and D are also configured to communicate via a second optical channel data unit (ODU) label switched path via the communication links 20d-g. The first optical channel data unit (ODU) label switched path 30 may be a working connection 30, and the second optical channel data unit (ODU) label switched path may be a protecting connection 32. Any two nodes A-K may connect via multiple optical communication links 20. For bidirectional communication, for example, an optical link or fiber may be dedicated for data traffic transmitted in one direction (or both directions), another optical link may be dedicated for data traffic transmitted in the opposite direction, and yet another optical link may be used in case of a failure of the connection. In practice, there may be N working connections and M protecting connections between any two of the nodes A-K, where M<N.

In the case of circuit switched networks (such as Optical Transport Networks), the protecting connection for a given working connection may share bandwidth with other protecting connections along some of the hops from the source node (also referred to as the headend node) to the destination node (also referred to as the tailend node). More specifically, bandwidth sharing occurs across segments that are common between protecting connections, for example, in FIG. 2, connections across intermediate nodes E-F-G. A given protecting connection may share bandwidth with different protecting connections across different network segments. As a result of sharing between connections, a network resource (e.g. collection of one or more optical channel payload unit (OPUk) tributary slots) is simultaneously allocated to multiple protecting connections. This is commonly referred to as "over subscription". In Shared Mesh Protection (SMP) deployments, the over-subscription ratio aids in determining network resource utilization. For network operators that want to aggressively reduce the amount of bandwidth dedicated to protecting connections, the over-subscription ratio can range from 1:3 to 1:10 (i.e. each unit of network resource is shared between three or ten protecting connections respectively).

As a result of the setup of the protecting connection(s) (which could be triggered by management requests or signaling), the intermediate nodes become aware of the network resources, and the set of protecting connections that share these resources. The intermediate nodes are also aware of the priorities for the protecting connections that compete for the same resources, so that they can allocate the network resource to the highest priority protecting connection that needs to be activated.

The head-end node or the tail-end node is responsible for detecting the failure of the working connection. Once the head-end node or the tail-end node detects a defect in the working connection, the head-end node or the tail-end node initiates recovery action by activating the corresponding protection connection with activation messages. The node that initiates recovery action by activating the corresponding protection connection with activation messages may be referred to as the source node. The mechanisms used to detect the failure of the working connection are known to those in the art.

The activation message is forwarded hop-by-hop until the destination node (i.e. the tail-end node) is reached. At that point, the head-end node receives an acknowledgement from the tail-end node, thereby informing the head-end node that the activation is complete.

In the case of the failure of the activation attempt (e.g. due to the shared resource being currently allocated to a higher priority connection), the source node receives error messages originated from the intermediate node which couldn't successfully propagate the activation request to the downstream node.

Figure 4:
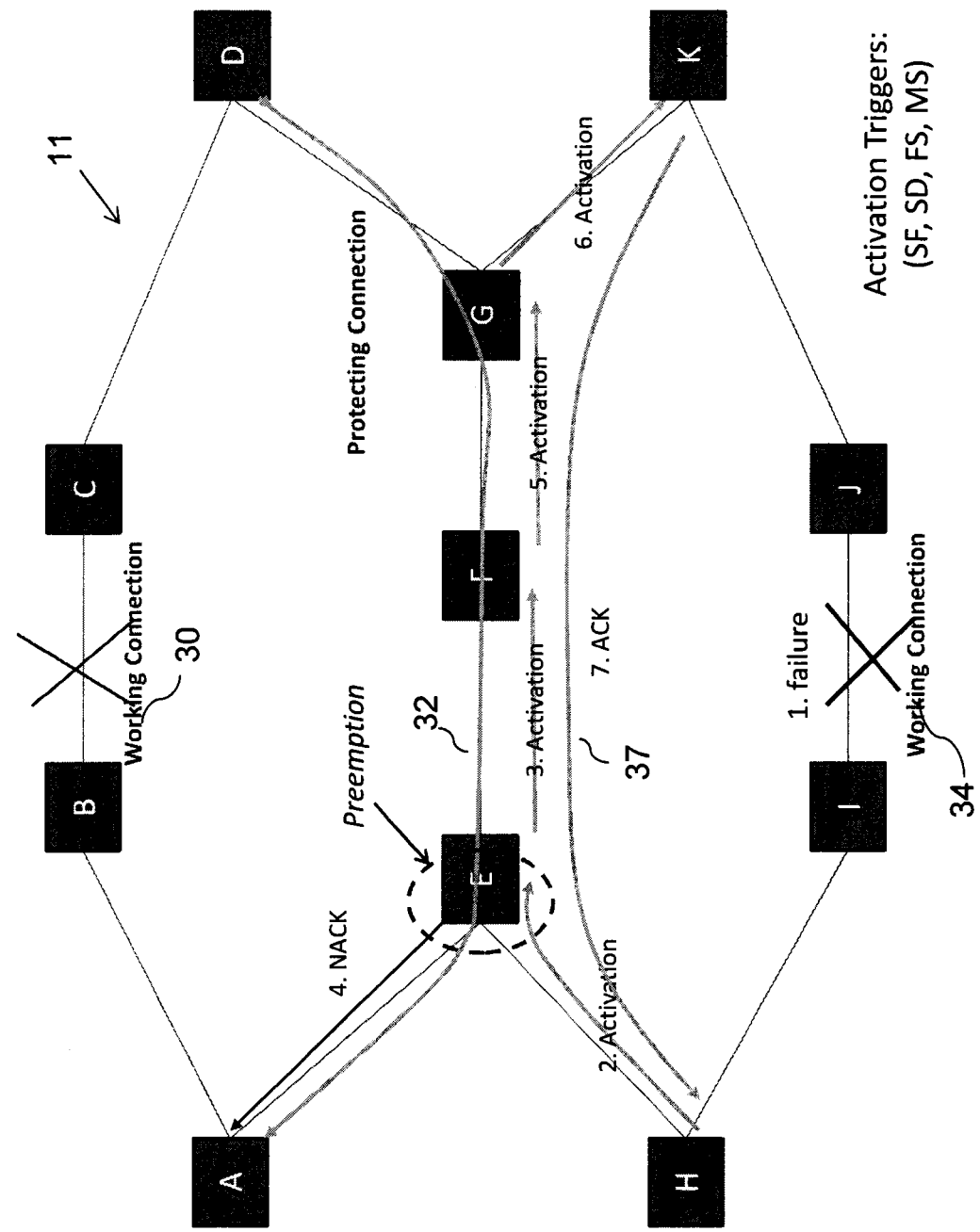
FIG. 4 is a diagram of an exemplary shared mesh network having a failure of a working connection and illustrating a successful activation sequence activating a first protecting connection and pre-empting a second protecting connection.

When the new protecting connection being activated is of a higher priority than the current "occupant" of a shared network resource, Shared Mesh Protection supports preemption, as will be further elaborated in the discussion of FIG. 4. As a result of the preemption action, the network reclaims the resource from the existing connection, notifies the head-end node of the existing connection that has been preempted, and then assigns the resource to the new connection.

Referring again to FIG. 1, to support protection switching, the line modules 12 and 14 of the node 10 keep track of the protecting connections and associated network resources (e.g. time slots). Upon the reception of activation messages from the Automatic Protection Switching (APS) channels, the line modules 12 and 14 identify the corresponding protecting connections and activate them in a timely manner.

At each node 10, the ingress line module 12 picks up the activation messages from the APS channel, parses the messages, performs the requested operation, and forwards the messages to the egress line module 14. At the egress line module 14, the selected protection channel identification will be updated before the messages are injected into the APS channel.

The actual protecting connection information may be setup via the control plane 16, which may be outside the scope of this disclosure. During the setup, each node 10 may associate a unique identification that may consist of one or multiple timeslots to a protecting connection. Further, upon the completion of protection setup, the line modules 12 and 14 preferably maintain all of the identification information.

At the time of a network failure, the activation messages may traverse between nodes 10 over the APS channel carrying the identifications, and be picked up and processed at each node 10. Since this essentially eliminates the interface latency between control plane and data plane, the switch-over speed can be greatly improved.

As discussed in G.smp (Reference [1]), the Shared Mesh Protection (SMP) signaling protocol should be compatible to the existing transport network protection methodology; should support activation and de-activation on pre-configured protecting connections; should support initiation of protection signaling from network edge nodes; and should support reliable messaging between network nodes.

Reliable messaging may be accomplished in multiple ways. For example, a sending node A may assign a sequence number to a new message the sending node A originates. A receiving node, such as the nodes E of FIG. 2, individually acknowledges the new message by referring to the sequence number used by the sending node A. The sending node A retransmits the sending node A's own messages until acknowledged by the receiving node E. Once a retransmission threshold is exceeded, and no acknowledgement has been received from the receiving node E, the sending node A may take appropriate recovery action(s).

In the context of circuit networks, such as Optical Transport Networks, user data may be encapsulated in "containers" with an overhead. The containers are reliably transmitted between nodes 10 within the mesh network 11. In Packet Switch Networks, a message may be sent with a sequence number, then nodes within the packet switch network may wait, and such nodes may send the message again. In contrast, circuit switch networks transmit information continuously.

In one embodiment, protocol information is adapted for use in the context of circuit switch networks transmitting information continuously, such as Optical Transport Networks (OTN) in a shared mesh network in a shared mesh protection (SMP) environment. Shared Mesh Protection protocol information may be encoded into the message container's overhead to achieve timely and reliable message delivery. This Shared Mesh Protection protocol information may include messages that contain Action Types and Request Types. The Action Types and Request Types may be represented by a number value.

In one embodiment, the Shared Mesh Protection protocol may include the following Action Types:

Activation Action Type—This action is triggered by the headend node (or tailend node) to activate a protecting connection. The intermediate nodes propagate this message toward the other end of the protecting connection.

De-activation Action Type—This action is used to de-activate a particular protecting connection. The SMP message having the de-activation action type can be originated by one end of a protecting connection (i.e. headend node or tailend node). The intermediate nodes propagate this message toward the other end of the protecting connection.

Query Action Type—This action is used when an operator decides to query a particular protecting connection.

Because shared mesh protection operation utilizes coordination between nodes, in one embodiment additional Action Types may be used, including a Notify Action Type. The Notify Action Type may be used to avoid potential mis-connection when the activation/de-activation is initiated at the headend (or tailend) nodes. To avoid potential mis-connection, the user traffic cannot be switched onto the protecting connection until the reception of an acknowledgement from the tailend (or headend) nodes. The Notify Action Type may also be used if an intermediate node cannot process the activation requests, due to lack of resources or preemption levels, at which point the intermediate node may report the failure to the request originators. These are two examples of possible uses of the Notify Action Type, but it is understood that the Notify Action Type may be used in other circumstances as well.

When adapting Shared Mesh Protection to Optical Transport Networks (OTN), the Action Types may be mapped to the appropriate fields as defined in G.873.1. This Optical Channel Data Unit Shared Mesh Protection (ODU SMP) protocol includes the Action Type and the Specific Request Type in a value which can be encoded into the overhead of the containers previously discussed.

In one embodiment, Optical Data Unit Shared Mesh Protection Request Type (ODU SMP) encoding may have the form illustrated in FIG. 3. Included in the Notify Action Types are the Value 1010 Acknowledgement (ACK) and the Value 1001 Negative Acknowledgement (NACK). ACK may be used to acknowledge a successful activation/de-activation request in a shared mesh network with shared mesh protection. NACK may be used to report a failure in activation/de-activation process in a shared mesh network with shared mesh protection.

As an example of the use of Shared Mesh Protection encoding protocols, referring again to FIG. 2, in the figure, the working connection 30 (A-B-C-D) is protected by protecting connection 32 (A-E-F-G-D). When node A detects a failure (for example, a Signal Fail (SF)) on the working connection 30, it will initiate an activation request over the protecting connection 32. The activation message will be encoded as a part of Optical Channel Data Unit Over Head (ODU OH) in accordance with the present disclosure.

Upon the examination of the activation requests, nodes E, F, G and D will be programmed to accept user traffic, and the tailend node D is responsible for sending the success acknowledgement back to node A.

After initiating the activation, node A will be waiting for the response from the mesh network 11. If the Request Type Notify Message ACK is received within a time interval, node A will switch the user traffic on to the protecting connection 32. Optionally, node A may withdraw the activation, notify the operator and choose another protecting connection to activate.

If node A decides to withdraw the protection, node A may encode a No Request (NR) Request Type Activation Message, as shown in FIG. 3, in the ODU OH. The network nodes E, F, G and D will respond by removing the protection switching. The tailend node D may then, once again, send the Request Type Notify Message ACK to confirm the de-activation sequence.

If node A decides to query the protecting connection 32, node A may initiate an Exercise (EXER) Request Type Query Action Message, as shown in FIG. 3, in the optical channel data unit overhead (ODU OH). The network nodes E, F, G and D will examine the protecting connection 32, and Node D will confirm the query action.

As an example of the use of the NACK Notify Action Types, FIG. 4 illustrates an exemplary Shared Mesh Protection preemption sequence on the shared mesh network 11. Following the previous example, the protecting connection 32 (A-E-F-G-D) is responsible for protecting the working connection 30 (A-B-C-D). Additionally, in this example another working connection 34 (H-I-J-K) is protected by protecting connection 37 (H-E-F-G-K). Network resources on connection nodes and links E, F and G are shared by both A-E-F-G-D and H-E-F-G-K. Further, the operator has given higher priority to connection H-E-F-G-K.

In this example, initially there is a failure over link B-C, which results in the activation of protecting connection 32 (A-E-F-G-D). Soon after, there is another failure over link I-J. Node H will initiate the activation sequence of the protecting connection 37. However, when the activate messages arrive on node E, the resources have been taken during the previous protection event by protecting connection 32 (A-E-F-G-D). Given the priority level, node E will remove the previous protection in favor of the new activation requests for the protecting connection 37.

To handle the preemption, node E will relay the activation messages to node F, while sending a Request Type Notify Message Negative Acknowledgement (NACK) to node A by encoding the acknowledgement in the ODU OH to notify Node A of the occurrence of preemption. In response, node A has the option to withdraw the protection, alarm the operator and choose another protecting connection.

Figure 5:
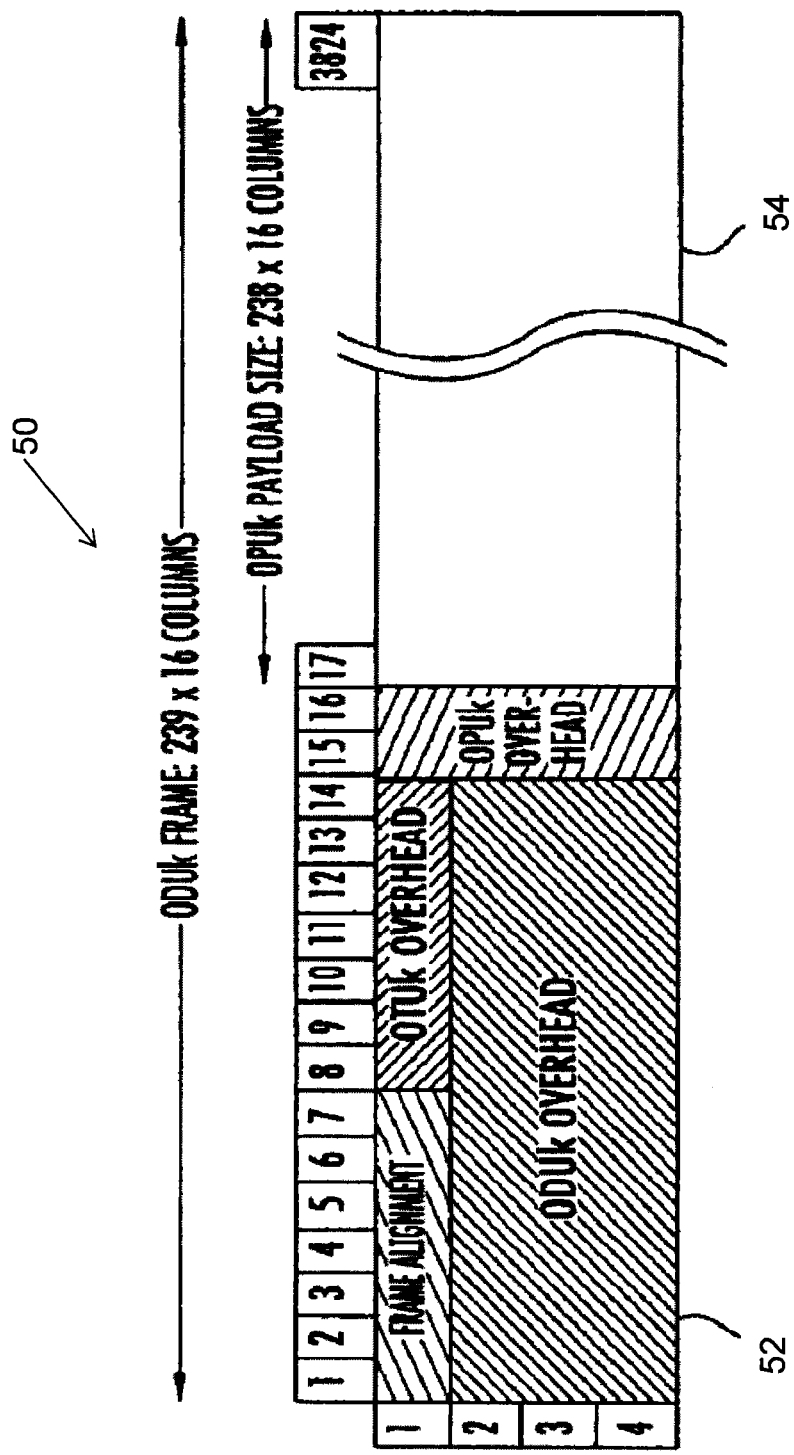
FIG. 5 is a diagram of an optical channel data unit (ODU) frame format used in embodiments of the inventive concepts described within the present disclosure.
Figure 6:
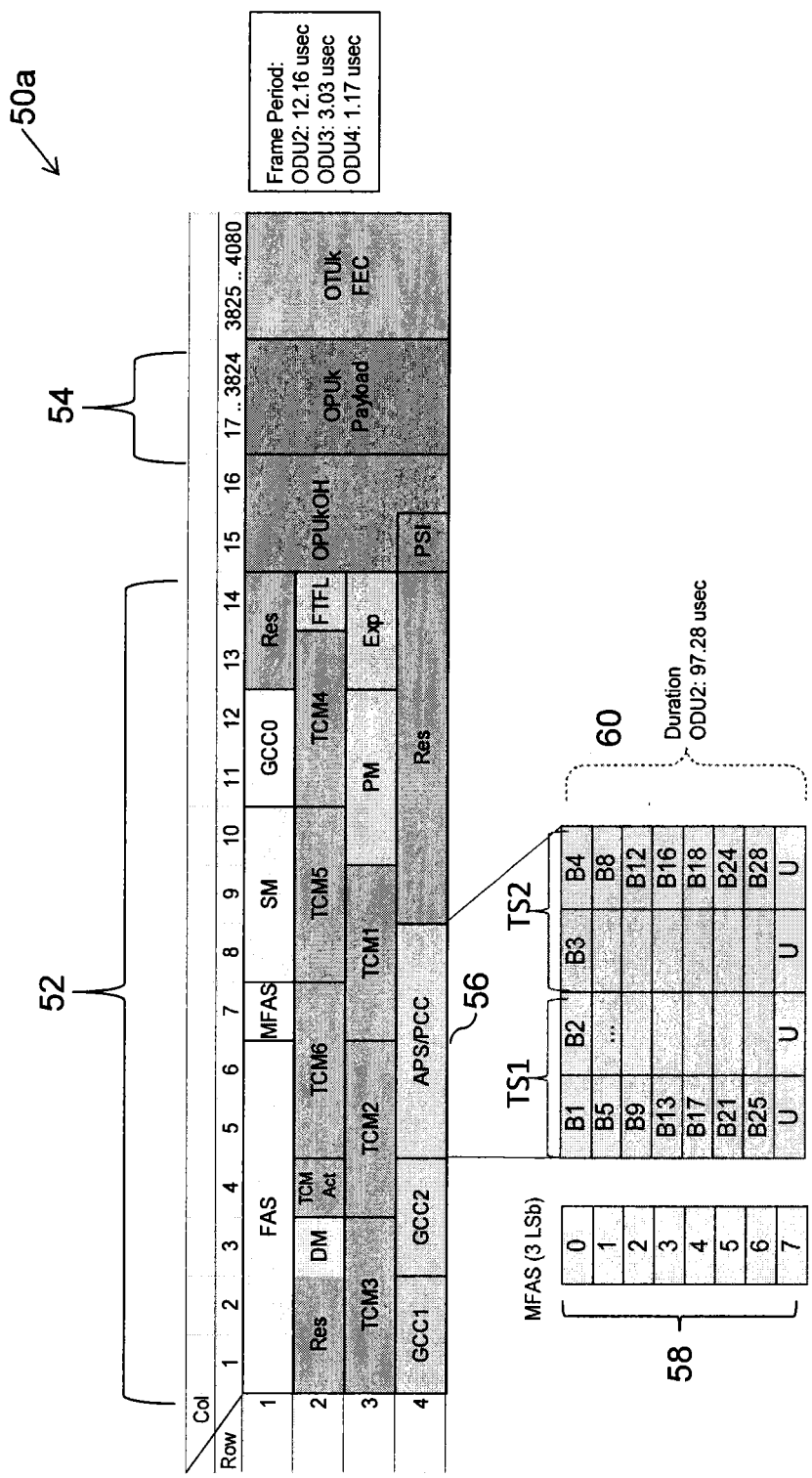
FIG. 6 is a diagram of an optical channel data unit frame format including a shared mesh protection message encoded into an APS/PCC field of the optical channel data unit frame format.

Referring now to FIG. 5, this figure is a diagram of an ODU0 frame format 50 for communication between nodes 10 within the mesh network 11. Like other ODUjs, the ODU0 frame format 50 consists of a structure of four rows and 3824 columns, as presented in FIG. 5. The ODU0 frame format 50 is further divided into an ODUk overhead area 52 (the first fourteen columns) and an optical channel payload unit (OPU) area 54. The optical channel payload unit area 54 contains two columns of overhead and 3808 columns of payload area which is available for the mapping of client data. A variety of distinct fields, such as an APS/PCC field 56 (as shown in FIG. 6) are provided within the ODUk overhead area 52 for reasons well known in the art.

In prior art packet switch networks, the Shared Mesh Protection process in each of the nodes uses the retransmission of messages to realize reliable messaging with other nodes in the packet switched network. This retransmission of messages is usually achieved by replicating messages in software, or via special hardware, for example FPGAs. In contrast, one embodiment of this disclosure simplifies reliable messaging in the circuit switch shared mesh network environment, such as Optical Transport Networks. In this embodiment, the Shared mesh Protection messages are transmitted in a more timely and reliable manner.

To accomplish this, one embodiment of the disclosure utilizes the architecture of shared mesh networks, as explained in G.709 (Reference [6]). For example, as explained previously, the frame formats defined in G.709 include overhead (OH) data locations which are periodically transmitted by hardware, once configured by software. Since this retransmission is already in effect, there is no need to include in the messages an encoded sequence number. This simplifies the message and reduces the needed space for the message.

Additionally, the Shared Mesh Protection messages require a protecting connection identification, which specifies the protection connection which is being activated. Since these connection identifiers can be "locally significant" (that is, local to a HO-ODU link), they can be compressed into smaller (bit) fields. In one embodiment, the connection identifiers are not required to be unique, because the combination of the connection identifier with the Tributary Slot information is unique, as explained below.

Further, on a given HO-ODUk link, the maximum number of active protecting connections is equal to the number of tributary slots in the OPUk signal. Thus, for example, on ODU2/ODU3/ODU4 links, the maximum of 8/32/80 activations applies when 8/32/80 ODU0 protecting connections are being activated. If the post-activation composition of a HO-ODU link consists of a mix of many ODU types, the number of simultaneous activations will be lower than the maximum number. This information can be used to compactly represent the Shared Mesh Protection messaging that occurs over the HO-ODU Overhead (OH). The limit on the number of possible activations over Optical Transport Network Links also applies to the possible deactivation attempts that can be in progress over a link.

For time-critical operations such as protection switching, circuit switched transport networks, such as the mesh network 11, have used dedicated channels encoded as part of the transport overhead for exchanging APS (Automatic Protection Switching) messages between transport entities. Optical Transport Networks (OTNs) utilize the APS/PCC field 56 in the OTUk frame to transport the messaging required for supporting various protection schemes (e.g. 1+1 ODU SNCP). Therefore the APS/PCC field 56 could be utilized to transport ODU SMP messages also.

In the case of Optical Channel Data Unit (ODU) protection mechanisms, the APS/PCC field 56 associated with the Optical Channel Data Unit (at the PM, or TCM1-TCM6 levels) are utilized for messaging purposes. Bytes within the APS/PCC field 56 are sourced/sinked at the trail termination points (i.e. ODUkT_TT, or ODUkP_TT) in the networks. In the prior art, all the intermediate nodes located between these termination points transparently passed these Overhead (OH) fields without analyzing the data with the fields.

In the case of Optical Channel Data Unit Shared Mesh Protection (ODU SMP), multiple (potential, or candidate) LO-ODU protecting connections can share resources on a single link. Thus, for example, protecting connections 32 (of type ODU0), and 37 (of type ODU1) (as shown in FIG. 4) could make use of the tributary slots {1}, and {1, 5} respectively within a HO-OPU2; thus sharing tributary slot 1 among these connections. In Optical Channel Data Unit Shared Mesh Protection (ODU SMP), the data for protecting connection 32 does not flow until the cross-connect is established. As a result, the Overhead (OH) for the LO-ODU is not usable for Shared Mesh Protection messaging. Typically, this messaging must make use of the HO-OPUk Overhead (OH).

Utilizing the HO-ODU APS/PCC fields 56 for ODU SMP purposes implies that the network operator will not be able to support any form of protection at the HO-ODU layer. This may also prove to be problematic in multi-carrier scenarios in which the first carrier uses the ODU APS/PCC channels for protection purposes. In such a scenario, the second carrier which uses the APS/PCC bytes for the carrier's own SMP signaling may not be able to guarantee APS/PCC byte transparency for transiting ODU connections (e.g. when such a transit connection occupies an entire OTU interface). As such, some operators might prefer the reuse of OH fields which are currently unallocated.

Referring now to FIG. 6, which is a diagram of an optical channel data unit frame format, to create reliable and timely delivery, the HO-ODU APS/PCC field 56 can be utilized for implementing Optical Channel Data Unit Shared Mesh Protection (ODU SMP) messaging. The APS/PCC field 56 is provided with 4 bytes in the Optical Transport Network Overhead (OTN OH), and is shared among the ODUkP (Path), and ODUkT (TCM1-TCM6) and OTUk layers. As a result, in a multi-frame period consisting of eight ODUk frames 58, twenty-eight bytes of Overhead (OH) 60 are available for Shared Mesh Protection (SMP) messaging. Note, however, that any other field in the HO-ODU overhead, such as one or more of the Reserved fields for example, may be used for implementing ODU SMP messaging. Additionally, the field within the overhead may be concatenated across multiple frames to yield a larger composite message.

FIG. 6 illustrates the use of the 4 byte APS/PCC field for the transport of SMP messages between nodes 10. When the APS/PCC OH area is used for SMP messaging, the last four bytes (which could be used for OTUk APS messaging) are not utilized. In other words, in the embodiment shown, if the APS/PCC OH area is used for SMP, only the bytes related to HO-ODUk APS messaging are repurposed for the sake of SMP messages; the network operator is free to deploy independent protection at the OTUk layer, without interfering with the SMP messaging. If some field other than the APS/PCC field 56 is used (such as that illustrated in FIGS. 10 and 11), then the last four bytes are not necessarily reserved.

Figure 7:
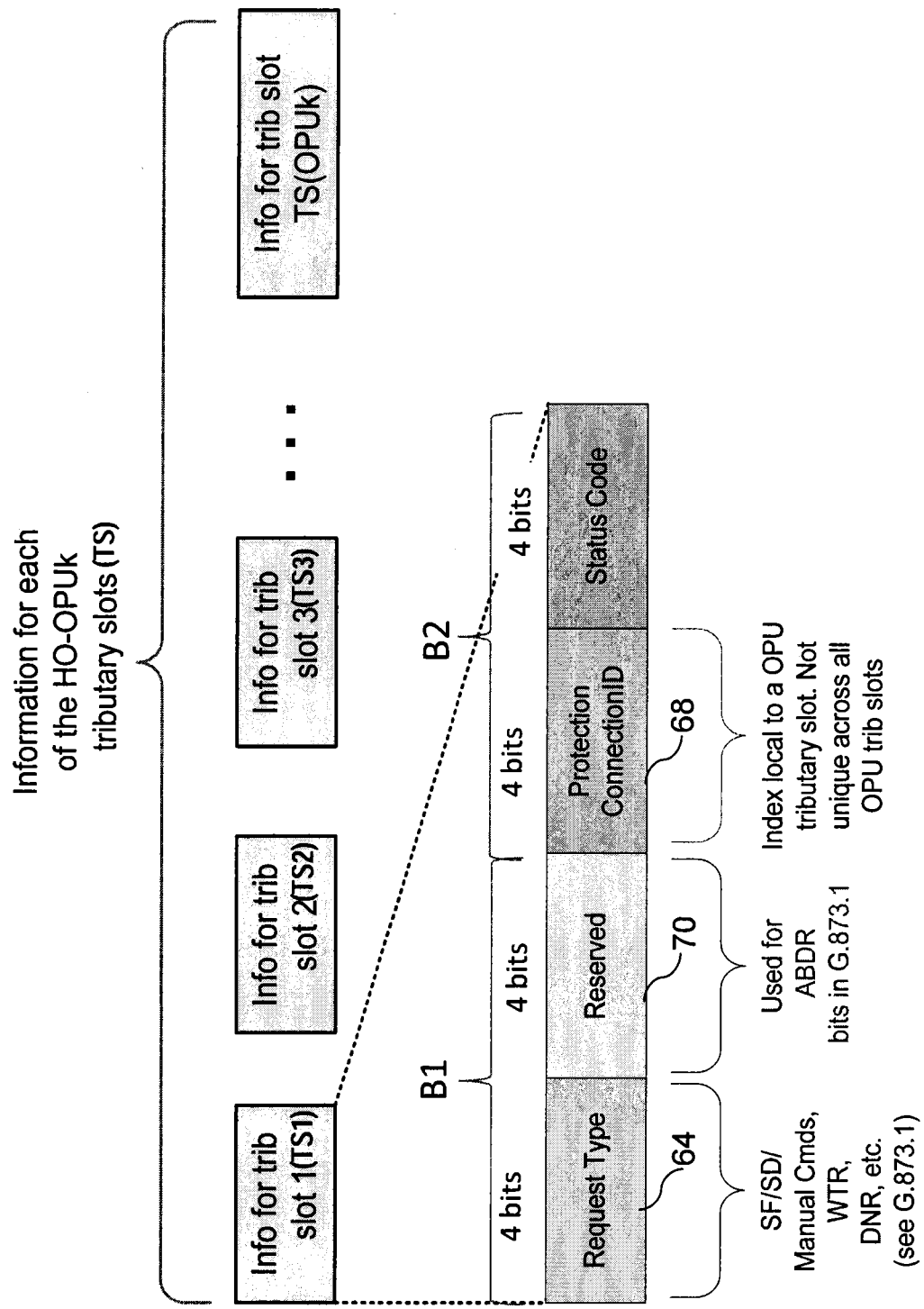
FIG. 7 is a diagram of an exemplary Shared Mesh Protection (SMP) Message Format.

FIG. 7 exemplifies the Shared Mesh Protection (SMP) Message format within the HO-OPUk tributary slots. In this example, the information for tributary slot 1 (TS1) is contained in byte labeled B1 and byte labeled B2, as shown in FIG. 6. As discussed above, the protecting connections can be identified in a hierarchical manner. The complete ODU SMP message consists of an array of information elements, where each element contains information pertaining to a single OPUk tributary slot. The activations/deactivations are not done at the granularity of a tributary slot, but at the level of a protecting connection. When a protecting connection occupies a single tributary slot, the associated activation/deactivation messages may be contained in one array element. When a particular connection occupies multiple tributary slots, the information conveyed for each of the tributary slots may preferably be set in a consistent manner across the set.

Within each tributary slot, a fixed-size of bytes can be used to encode the Shared Mesh Protection (SMP) protocol messages, such as a Request Type parameter 64 and a ProtectingConnectionID parameter 68, for example. The ProtectingConnectionID parameter 68 identifies which one of the pre-established protecting connections that can traverse a link is being activated or deactivated. The Request Type parameter 64 and the ProtectingConnectionID parameter 68, for example, can be located within fixed locations within the APS/PCC field 56. For example, as shown in FIG. 7, the Request Type parameter 64 may be located within the first four bits of B1 and the ProtectingConnectionID parameter 68 may be located within the first four bits of B2 to indicate that such Request Type parameter 64 and the ProtectingConnectionID parameter 68 are associated with the tributary slot 1 (TS1). However, the SMP protocol messages may be specified to be encoded in fixed locations in other fields in the overhead container, such as the Reserved field for example.

In one embodiment, to process the incoming Shared Mesh Protection (SMP) messages, a receiving node 10 is able to detect the Shared Mesh Protection action on the tributary slots by reading the Request Type parameter 64 which may be within a fixed location within the APS/PCC field 56. If an SMP operation is required, a processor (or component) of the ingress line module 12 can then read the associated ProtectingConnectionID parameter 68 to identify the protecting connection and subsequently perform appropriate actions. Locating the Request Type parameter 64 and the ProtectingConnectionID parameter 68 in the fixed location within the APS/PCC field 56 allows the receiving node to know where to look for the SMP information for each tributary slot.

In an OTUk link, the number of potential connections is $M*2^{TS(OPUk)}$, where M denotes the overbooking factor. Overbooking includes the possibility that multiple connections (of different priority) can be competing for the same set of tributary slots in HO-OPU. TS(OPUk) denotes the number of tributary slots in the OPUk containers. If no limitations are placed on the number of possible connections which could be activated/deactivated, the ProtectingConnectionID parameter 68 field would occupy at least TS(OPUk) bits (e.g. 80 bits for OTU4 links). In the embodiment illustrated in FIG. 7, the Protecting Connection ID is set to a 4-bit field, therefore, the oversubscription ratio would be 16.

In this embodiment, the ProtectingConnectionID parameter 68 is compactly encoded into the Automatic Protection Switching (APS) messages previously discussed. This compact encoding includes the Request Types used for Optical Channel Data Unit Shared Mesh Protection (ODU SMP), including those shown in FIG. 3.

The message format is based on the APS channel format specified in G.873.1 [8.1.2, FIG. 1]. The SMP-ProtectionType field in FIG. 3 consists of 4 bits—which were previously allocated to the encoding of the protection type bits ("ABDR") in G.873.1. In one embodiment of the present disclosure, encoding "0111" of the ABDR bits may be utilized to represent the SMP mode of operation. This codepoint corresponds to a combination in which there is no APS channel, and the protection mode is bidirectional switching (which is an unused codepoint). This allows a receiving node to determine whether the APS bytes contain the standard messages, or the ODU SMP messages which make use of the same OH locations. This encoding allows nodes on both sides of a link to confirm that they have been configured in the SMP mode.

The method of encoding the SMP messages as an array of size TS(OPUk) covers the case in which TS(OPUk) ODU0 connections are being activated or deactivated.

The ProtectingConnectionID parameter 68 is preferably local to single tributary slot. That is, different OPUk tributary slots have independent spaces for this parameter. As an example, a ProtectingConnectionID parameter 68 of 1 in tributary slots 1, 3 in an OPU2 may refer to different protecting connections. When a protecting connection being activated or deactivated occupies multiple tributary slots (TS) within an OPUk, the value of the ProtectingConnectionID parameter 68 for each of the OPUk tributary slots need not be the same.

FIG. 8 is an illustration of an example of the use of the per-tributary slot ProtectingConnectionID parameter 68. For simplicity, FIG. 8 does not capture information about all tributary slots, but only those pertaining to tributary slots 1 through 4. In particular, note that a global connection "C1" which makes use of tributary slots 1 and 2 has connection identifiers of 1 and 3 respectively (in the per-TS information element).

Figure 9:
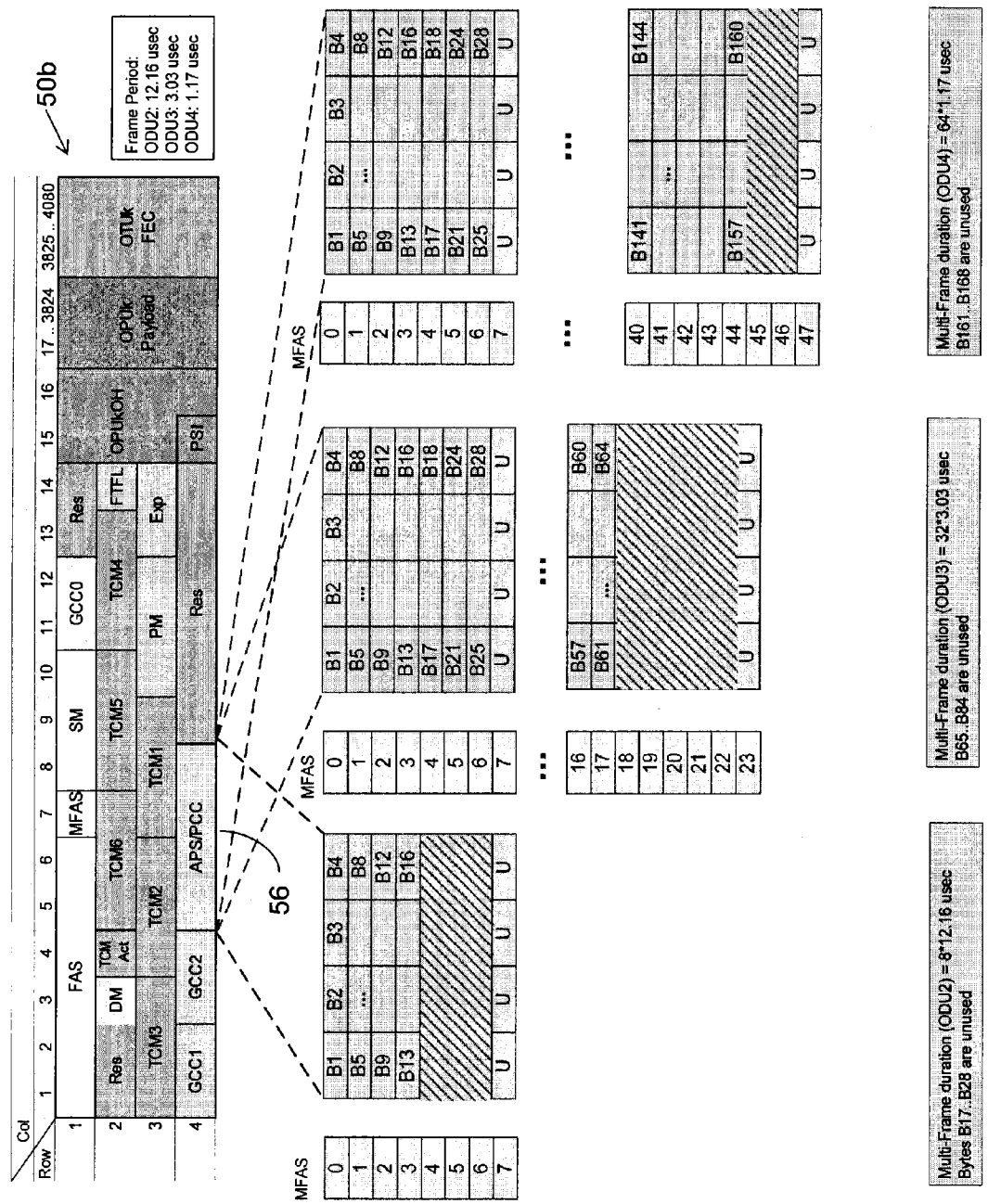
FIG. 9 is a diagram of mapping the shared mesh protection message into the APS/PCC field of the optical channel data unit frame format.

Note that the information for each tributary slot (as shown in FIG. 7) takes two bytes. This means that the messages consist of 16/64/160 bytes for the cases of ODU2/ODU3/ODU3 respectively. FIG. 9 shows an exemplary allocation of these Shared Mesh Protection (SMP) signaling bytes to the multi-frame sequence composed of the APS/PCC field 56. For example, the encoding of the Shared Mesh Protection messages for ODU2/ODU3/ODU4 links may utilize Jul. 17, 1944 frames at the appropriate rates. For simplifying the implementation, it would be convenient to make the frame periods 8/32/64 respectively. FIG. 9 illustrates the encoding of SMP messages using the APS/PCC fields 56 of three types of HO-ODUk links: ODU2, ODU3, and ODU4. In the case of ODU2 links, there are 8 tributary slots in the HO-OPU2, and the SMP messages for these 8 tributary slots will occupy 16 bytes. Multi-frame cycle has a period of 8xODU2 frames. The remaining OH bytes may remain unused. In the case of ODU3, there are 32 tributary slots in the HO-OPU3, and the SMP messages for these 32 tributary slots occupy 64 bytes. The allocation of these 64 bytes as a function of the LSB (least significant bits) of the MFAS is shown in the figure. The multi-frame cycle consists of 32 ODU3 frames, and all the OH bytes after B64 remain unused. The functionality is similar for the ODU4 links, except that an OPU4 contains 80 tributary slots.

The receiving node 10 preferably begins processing the messages only after receiving the message for all the tributary slots. This gathering of the entire Shared Mesh Protection protocol message takes multiple HO-ODUk frames, as exemplified in FIG. 9.

It is expected that the receiving node 10 will employ the usual acceptance (or filtering) process, as is known in the art, to Shared Mesh Protection messages to ensure that a consistent message is being received, before the node 10 begins processing the message. In one embodiment, the default acceptance count for Shared Mesh Protection messages may be three.

The receiving node 10 can begin to process the message after the last byte of the Shared Mesh Protection message has been received. Thus, for example, the receiving node 10 can start to process the message after forty-four frames have been received, without requiring a wait for the period used by the sender (which would be 64 frames).

In this embodiment, the two neighboring nodes 10 agree on the ProtectingConnectionID parameter 68 assigned to a particular connection for each Tributary Slot. This condition may be ensured for manually provisioned or signaled protection connections.

Figure 10:
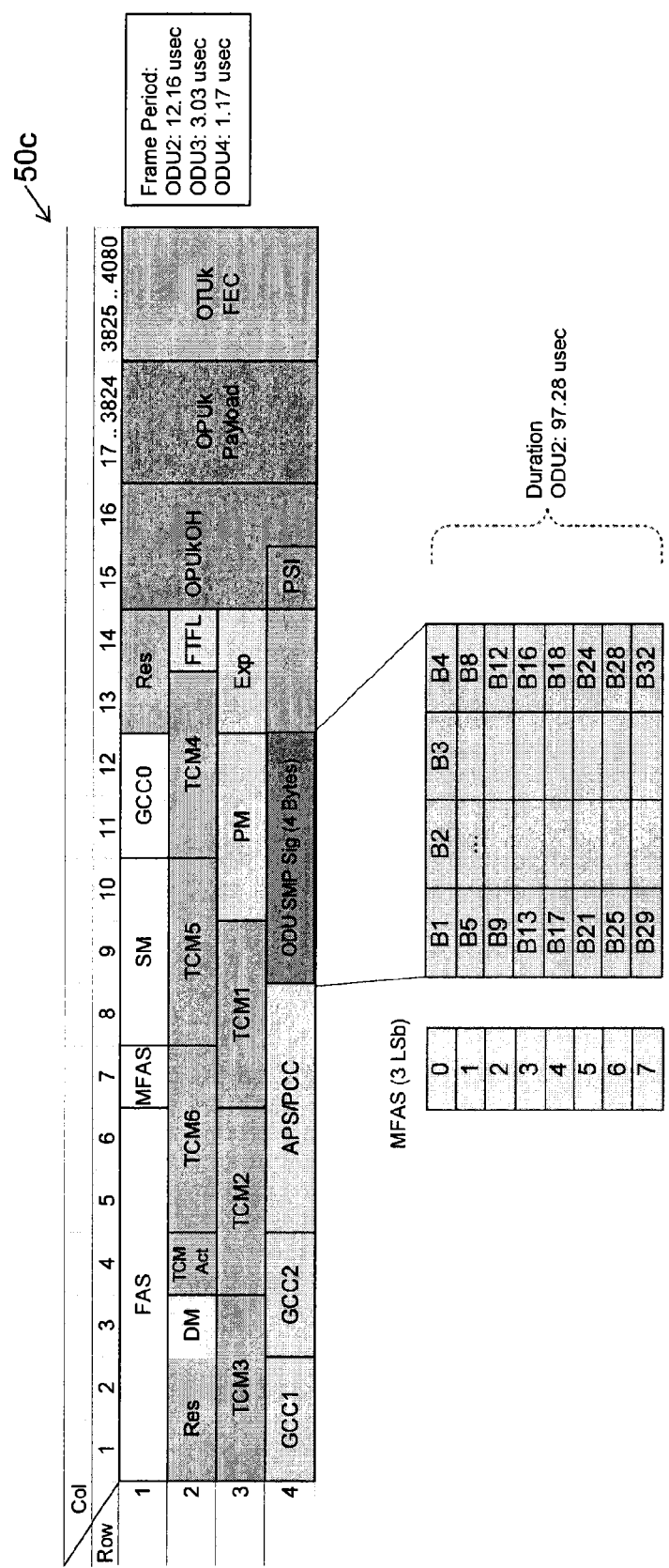
FIG. 10 is an optical channel date unit (ODU2) frame format illustrating the mapping of the shared mesh protection message into a Reserved field of the frame format.
Figure 11:
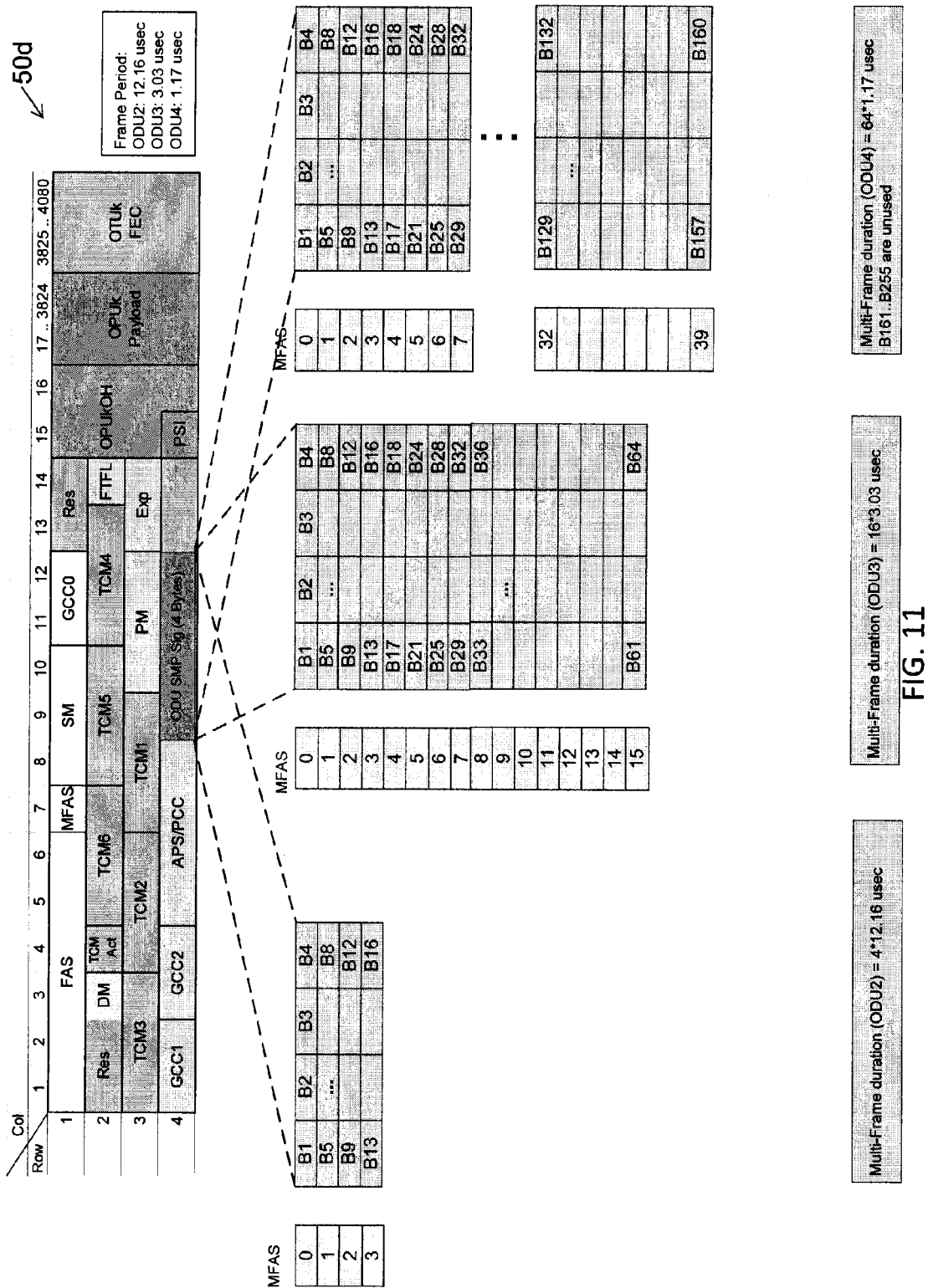
FIG. 11 is a diagram of mapping the shared mesh protection message into the reserved field of ODU2, ODU3 and ODU4 frame formats.

FIG. 10 illustrates the use of four Reserved (RES) bytes for the transport of Shared Mesh Protection (SMP) messages. Unlike the scenario illustrated in FIG. 6, this embodiment does not leave four bytes of OH unused. This allows for ODUk APS/PCC OH to be preserved in SMP domains and additionally SMP messages can use a different MFAS cycle (than the APS/PCC messages). Likewise, FIG. 11 illustrates the encoding of SMP messages when four RES bytes are utilized, for HO-ODU2/ODU3/ODU4 links.

CONCLUSION

Conventionally, circuit networks, such as optical transport networks, transmit protocol information in the overhead of message containers. Shared Mesh Protection messages are critical to the operation of network, and service experience to the network users. However, currently there is not a method to transmit Shared Mesh Protection messages in a reliable and timely manner. In accordance with the present disclosure, these deficiencies are addressed with a methodology and nodes addressing the requirements of the Shared Mesh Protection signaling protocol within an overhead of an optical data unit container transmitted in-band with actual data and read by nodes on a hop-by-hop basis to achieve timely and reliable message delivery. The shared mesh protection signaling protocol can be embedded within an APS/PCC field or another field or location within the overhead. In either case, the nodes 10 within the mesh network 11 are preferably programmed to analyze a predetermined location within the overhead for reading and acting upon the shared mesh protection signaling protocol.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations may have been described as "components" or "circuitry" that perform one or more functions. The term "component" or "circuitry" may include hardware, such as a processor, an application specific integrated circuit (ASIC), or a field programmable gate array (FPGA), or a combination of hardware and software.

In addition, information regarding the optical channel data unit label switched paths can be stored and processed in a distributed fashion, or in a centralized fashion. For example, time slot information for the different multiplexing levels within the multiplexing hierarchy can be stored in 'Generalized Label Object' in respective PSB and RSB control blocks (PSB represents 'PATH state' and RSB represents 'RESV state'). The time slot information can be stored in a distributed fashion (distributed storage having multiple memory/storage devices) and processed in a distributed manner preferably by using a hop-to-hop processing. In another implementation, the distributed storage may be replaced by a centralized memory that stores the time slot information for all, or a subset, of the nodes 10. In this situation, the nodes 10 may include communication paths to obtain the connection information from the centralized memory.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

[1] ITU-T, "Draft recommendation G.smp", http://ifa.itu.int/t/2009/sg15/exchange/wp3/q9/2011-09-Chengdu/wd.
[2] G.smp living list, Meeting date: 14-25 Feb. 2011

[3] WD14, "Automatic Protection Switching (APS) protocol for Shared Mesh Protection", Q09 interim meeting, Shenzen, 16-20 May 2011.
[4] C1504, "Proposal of ODU Shared Mesh Protection", ITU-T SG15 Study Period 2009-2012, February 2011.
[5] C1280, "Automatic Protection Switching (APS) protocol for Shared Mesh Protection", ITU-T SG15 Study Period 2009-2012, February 2011.
[6] G.709-v3 ITU-T, "Interfaces for the Optical Transport Network (OTN)", G.709 Recommendation, December 2009.
[7] G.873.1 ITU-T, "Optical Transport Network (OTN): Linear protection", March 2006.

What is claimed is:

1. A method comprising the steps of:
receiving an Optical Data Unit (ODU) container by a node in an optical transport network, the ODU having an overhead and complying with a G.709 International Telecommunications Union standard;
encoding, by the node, shared mesh protection protocol information into designated locations in the overhead, the shared mesh protection protocol information having at least one shared mesh protection message, the predetermined locations including a higher-order ODU (HO-ODU) automatic protection switching field; and
transmitting the shared mesh protection message through a data plane of the node.

2. The method of claim 1, wherein the shared mesh protection message includes tributary slot identification information for a communication link in the optical transport network.

3. The method of claim 1, wherein the step of identifying the protecting connection is defined further as identifying the protecting connection by a location of the information within the at least one field in combination with a protecting connection ID.

4. The method of claim 1, wherein the overhead field is comprised of bits, and wherein predetermined locations within the bits identify predetermined tributary slots.

5. The method of claim 1, wherein the node is an intermediate node.

6. The method of claim 1, wherein the shared mesh protection message encoded into the overhead is a first shared mesh protection message, and wherein the ODU container received by the node includes a second shared mesh protection message, and wherein the method further comprises the steps of the node reading and processing the second shared mesh protection message.

7. The method of claim 6 wherein the node is an intermediate node.

8. The method of claim 1, wherein the node comprises an ingress line module and an egress line module.

9. The method of claim 8, wherein the ingress line module performs the step of receiving the ODU container, and the egress line module performs the step of encoding shared mesh protection protocol information.

10. The method of claim 9, wherein the egress line module encodes the shared mesh protection message into an automatic protection switching field.

11. The method of claim 10, wherein the automatic protection switching field contains bytes assigned to one or more tributary slots.

12. The method of claim 1, wherein the shared mesh protection message includes a request type parameter indicative of a type of action to be taken, and a protection connection identification parameter identifying a protecting connection.

13. The method of claim 12, wherein the type of action to be taken by the node is a notify action type.

14. The method of claim 12, wherein the type of action to be taken by the node is an acknowledgement request type.

15. The method of claim 12, wherein the request type parameter is indicative of a negative acknowledgement request type.

16. The method of claim 12, wherein the request type parameter is contained in a four bit field.

17. A method comprising the steps of:
receiving an Optical Data Unit (ODU) container that complies with a G.709 Standard of the International Telecommunications Union by an intermediate node in a mesh network, the mesh network comprising a protecting connection having the intermediate node, a headend node, and a tailend node, the ODU container having an overhead that includes shared mesh protection message is encoded in designated locations in the overhead, the predetermined locations including a higher-order ODU (HO-ODU) automatic protection switching field;
processing, by the intermediate node, a request set forth in the shared mesh protection message; and
transmitting the shared mesh protection message through a data plane of the node when the shared mesh protection message is present in the overhead.

* * * * *